United States Patent [19]
Matthias

[11] Patent Number: 6,151,587
[45] Date of Patent: Nov. 21, 2000

[54] COUPON DISPENSER AND METHOD FOR GENERATING COUPONS

[76] Inventor: John T. Matthias, 3676 118 La. NW., Coon Rapids, Minn. 55433

[21] Appl. No.: 09/121,548

[22] Filed: Jul. 23, 1998

Related U.S. Application Data

[60] Provisional application No. 60/053,510, Jul. 23, 1997.

[51] Int. Cl.$^7$ .................................................. G06F 17/60
[52] U.S. Cl. ............................. 705/14; 705/16; 235/381; 235/383
[58] Field of Search ...................... 705/14, 16; 235/383, 235/381

[56] References Cited

U.S. PATENT DOCUMENTS

| | | | |
|---|---|---|---|
| 4,550,221 | 10/1985 | Mabusth | 178/18 |
| 4,674,041 | 6/1987 | Lemon et al. | 705/14 |
| 4,896,791 | 1/1990 | Smith | 221/7 |
| 5,039,848 | 8/1991 | Stoken | 235/381 |
| 5,305,197 | 4/1994 | Axler et al. | 705/14 |
| 5,368,129 | 11/1994 | Von Kohorn | 86/52 |
| 5,380,991 | 1/1995 | Valencia et al. | 705/14 |
| 5,537,314 | 7/1996 | Kanter | 705/14 |
| 5,564,546 | 10/1996 | Molbak et al. | 194/216 |
| 5,620,079 | 4/1997 | Molbak | 194/217 |
| 5,845,259 | 12/1998 | West et al. | 705/14 |
| 5,855,007 | 12/1998 | Jovicic et al. | 705/14 |
| 5,859,414 | 1/1999 | Grimes et al. | 235/383 |
| 5,905,246 | 5/1999 | Fajkowski | 235/375 |
| 5,915,243 | 6/1999 | Smolen | 705/14 |

OTHER PUBLICATIONS

Gardner et al., "Communication framework to evaluate sales promotion strategies", Journal of Advertising Research, v38n3 PP: 67–71, May/Jun. 1998.

Karolefski, John, "Improved Standing", BrandMarketing Supplement to Supermarket News, Feb. 1998.

Freeman, Laurie, "Marketing the Market: Savvy grocers reach out to their super customers", Marketing News, v32n5 Mar. 1998.

Millstein, Marc; "Redeeming Values: New Coupon systems promise to boost redemption rates", Supermarket News, Aug. 1994.

*Primary Examiner*—Tod R. Swann
*Assistant Examiner*—Jagdish N Patel
*Attorney, Agent, or Firm*—Merchant & Gould P.C.

[57] ABSTRACT

A computer implemented coupon dispensing system is provided. The computer implemented coupon dispensing system includes a display area, a memory arrangement, a processor, and a printer. The display area includes a display screen having a plurality of product identification cells for selecting a product type. The memory arrangement is configured to store information comprising product identification information, product discount information, and product location information for locating a product in a store. The processor is coupled to the memory arrangement and the display screen and is configured to process the information stored in the memory arrangement in order to generate selected product data packets including selected product identification information, selected product discount information, and selected product location information. The printer is coupled to the processor and is provided for printing coupons having selected product identification information, selected product discount information, and selected product location information. A computer implemented method for dispensing coupons is provided.

26 Claims, 4 Drawing Sheets

COUPON DISPENSER AND METHOD FOR GENERATING COUPONS

This application claims the benefit of U.S. Provisional No. 60/053,510 filed Jul. 23, 1997.

FIELD OF THE INVENTION

The present invention concerns coupon dispenser technology. It concerns general techniques, methods, and apparatus relating to dispensing coupons. In particular, the present invention concerns an apparatus and method for generating coupons in a grocery store.

BACKGROUND OF THE INVENTION

Coupons are often dispensed at grocery stores for providing a reduction in the price of a particular good or product. Traditionally, the coupon is either torn or cut from a larger flier or sheet of paper incorporating numerous coupons therein. In addition, coupons are often available singly, and can be obtained from dispensers. In both types of situations, the coupons are generally preprinted, and are not tailored for a specific store.

SUMMARY OF THE INVENTION

A computer implemented coupon dispensing system is provided by the invention. The computer implemented coupon dispensing system includes a display area, a memory arrangement, a processor, and a printer. The display area includes a display screen having a plurality of product identification cells for selecting a product type. The memory arrangement is configured to store information comprising product identification information, product discount information, and product location information for locating a product in the store. The processor is coupled to the memory arrangement and the display screen, and is configured to process the information stored in the memory arrangement in order to generate selected product data packets including selected product identification information, selected product discount information, and selected product location information. The printer is coupled to the processor for printing coupons having selected product identification information, selected product discount information, and selected product location information.

The plurality of cells provided in the display screen include a graphic display identifying a plurality of goods. In general, each cell can be provided to represent a particular good. Alternatively, several cells can be grouped together to collectively identify a particular good. In general, it is expected that the number of cells provided in the display screen will be between about 50 and 150. Preferably, the graphic display can be changed relatively easily on a periodic basis, such as, every week or every month, without damaging the display screen. Preferably, a handicap keypad is provided for allowing handicapped individuals to operate the system.

The memory arrangement preferably includes a disk drive for storing information. In addition, the memory arrangement can be configured for storing information including the number of signals generated for a particular product selected, the date each signal was generated for a selected product, and the time of day each signal was generated for a particular product. Preferably, the computer implemented coupon dispensing system includes a modem for providing remote access to the memory arrangement.

A computer implemented method for dispensing coupons is provided by the invention. The method includes steps of generating a coupon identifying signal, processing the coupon identifying signal to provide a coupon printing signal, and printing a coupon from a printer based upon receipt of the coupon printing signal. The coupon identifying signal is preferably provided by selecting at least one cell from a plurality of product identification cells, wherein each cell includes product identifying information. The step of processing the coupon identifying signal to provide a coupon printing signal preferably includes processing the coupon identifying signal and data provided in a memory arrangement.

The memory arrangement is preferably configured to store information including product identification information, product discount information, and product location information for locating a product in the store. It should be appreciated, however, that the memory arrangement can be configured to include product identification information or product discount information or product location information, or any combination of these types of information. In addition, the memory arrangement can be configured to include information additional to those types of information identified above.

The step of printing a coupon includes printing a coupon including product identifying information, product discount information, and product location information for locating a product in the store. It should be understood, however, that the coupon can be printed with any one or combination of this type of information, and the coupon can be printed with additional information.

A computer implemented method for dispensing coupons is provided which includes the steps of providing a computer implemented coupon dispensing system, and selecting a product identification cell. Once the product identification cell is selected, the computer implemented coupon dispensing system then generates a coupon preferably including product identification information, selected product discount information, and/or selected product location information.

DETAILED DESCRIPTION OF THE PREFERRED EMBODIMENT

The coupon dispensing apparatus of the present invention can be referred to as the coupon dispenser or more simply as the dispenser. Alternatively, it can be referred to as a computer implemented coupon dispensing system. It is expected that the coupon dispensing apparatus will be provided in retail stores, such as grocery stores, to provide coupons for consumers.

Figure 1:
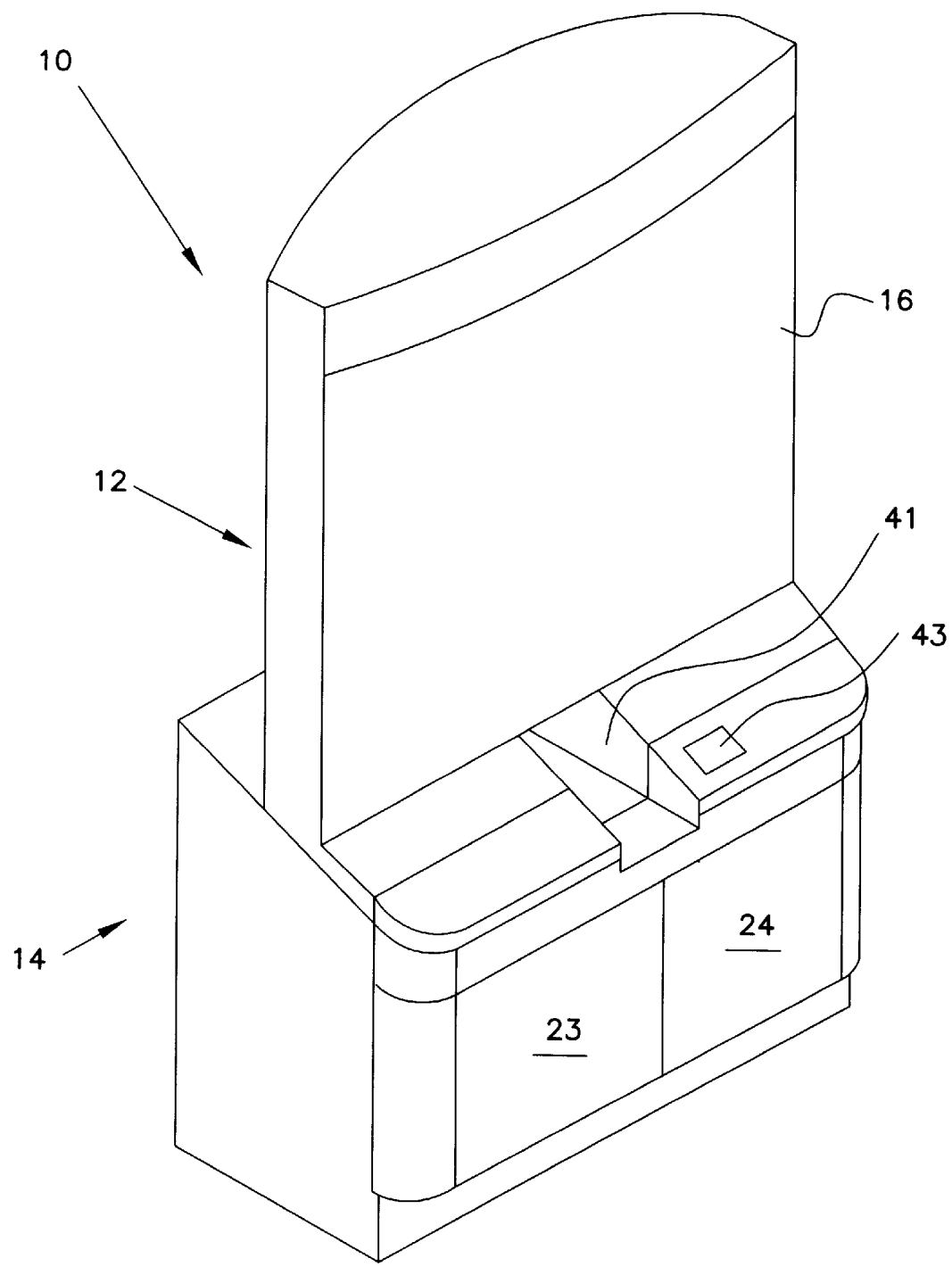
FIG. 1 is a perspective view of a coupon dispensing apparatus according to the principles of the present invention.
Figure 2:
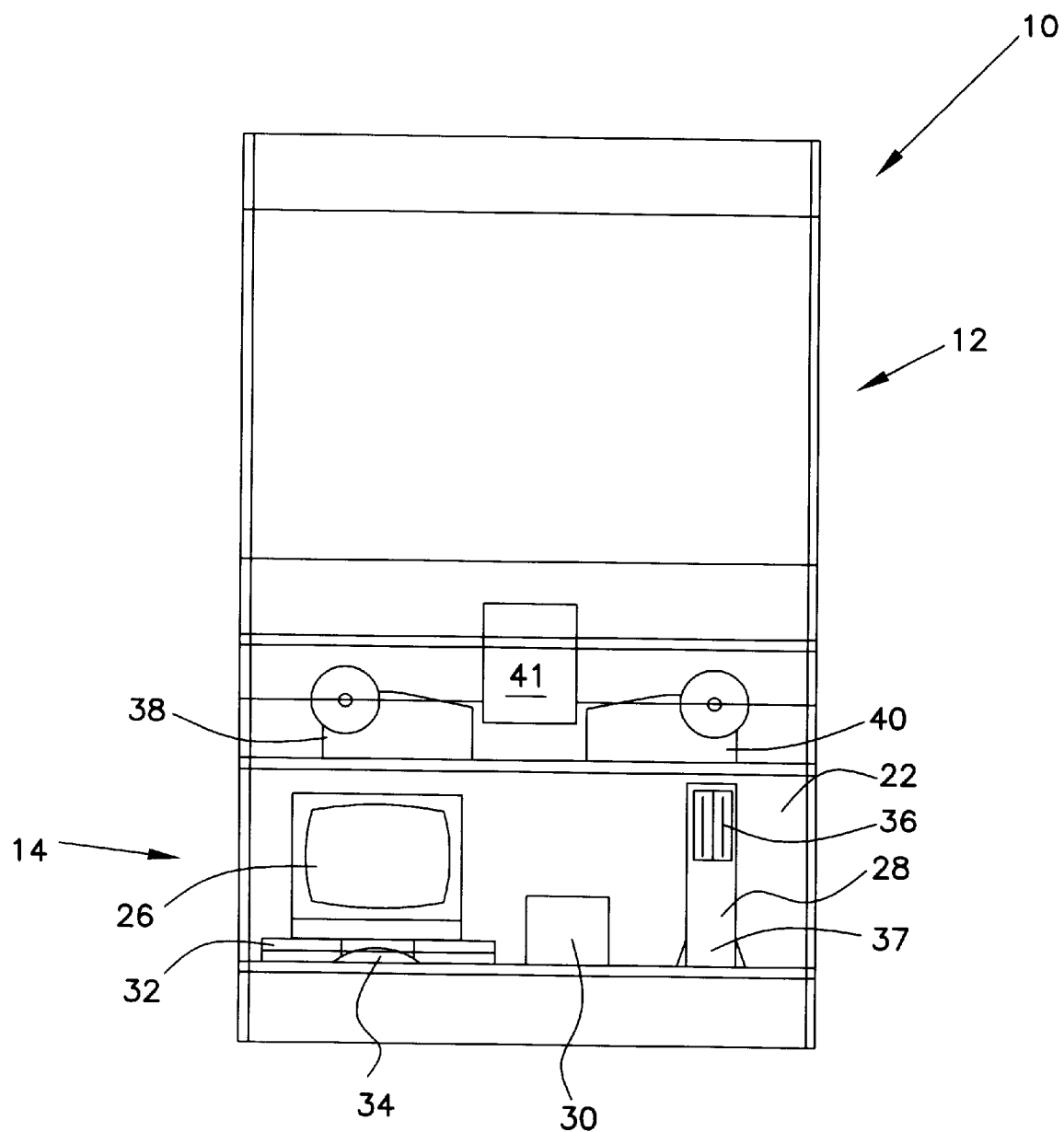
FIG. 2 is a front view of the coupon dispensing apparatus of FIG. 1.
Figure 3:
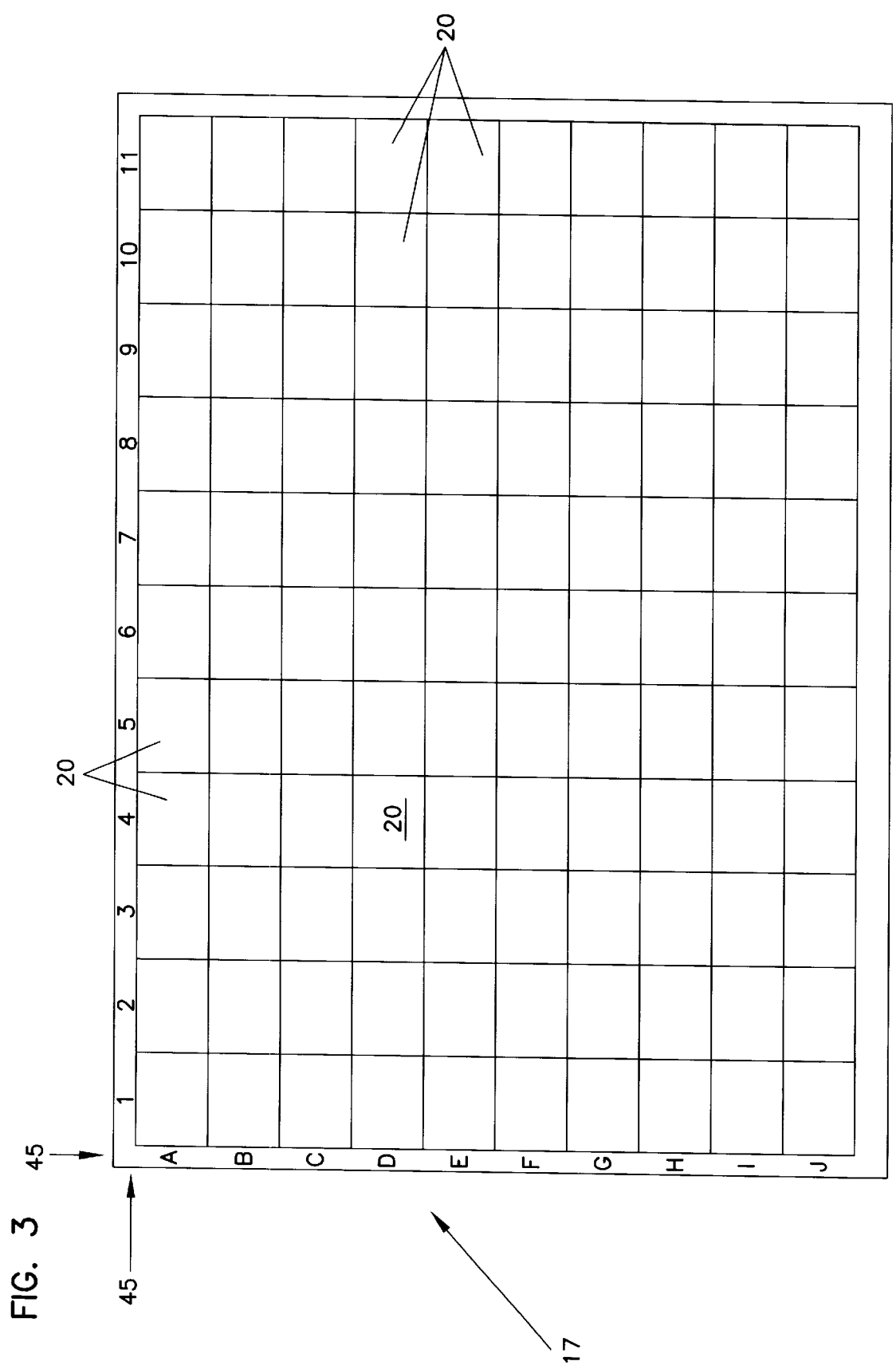
FIG. 3 is a front view of the display screen of the coupon dispensing apparatus of FIG. 1.

Now referring to FIGS. 1–3, a preferred coupon dispenser is indicated at reference numeral 10. The coupon dispenser 10 includes a display wall 12 and a cabinet 14. The display wall 12 includes a graphic display area 16 which includes a display or touch screen 17 having a plurality of cells 20 which identify a particular good or product for which a coupon can be issued. Each of the cells 20 can be provided to represent a distinct product or coupon for use with that product. It should be appreciated that the display screen 17 is shown in FIG. 3 and would be provided in the graphic display area 16 shown in FIG. 1.

The cabinet 14 includes an interior region 22 which can be accessed through cabinet doors 23 and 24. The doors 23 and 24 can swing open to reveal hardware including a monitor 26, a computer 28, and an uninterrupted power display 30. As shown, the computer 28 includes a keyboard 32 and a mouse 34 for inputting information. Information can additionally be introduced or retrieved via the disk drive 36 or modem 37. Additionally provided within the cabinet 14 are two printers 38 and 40 which are designed to operate together. Applicants have found that by providing at least two printers, the speed of printing coupons can be greatly increased. If a user selects numerous coupons, the coupons can be printed alternately between printer 38 and printer 40. It should be appreciated that one printer or more than two printers can be used according to the present invention. Furthermore, by including two printers, it is expected that if one printer malfunctions, the other printer will continue to work properly. Once a coupon is printed, it is dispensed through the opening or tray 41.

It should be appreciated that numerous different types or brands of hardware can be used to provide the coupon dispensing apparatus of the present invention. For the embodiment shown, the computer 28 is an IBM computer characterized by 166 MHZ, 16 MB, and 2.5 GB. The computer 28 includes a processor and a memory arrangement. The monitor 26 is an IBM 14 inch color monitor. The modem is an IBM G42 Sportster modem. As shown in FIG. 1, a handicap keypad 43 is provided. Preferably, the handicap keypad is one which is conventionally available and complies with the Americans with Disabilities Act requirements. The two printers 38 and 40 are Syntest SP5000 printers available from Telpar, Incorporated. The uninterrupted power display 30 can be obtained from American Power Conversion Company.

The coupon dispenser is a colorful, well-organized display of coupons that a consumer would normally use in a retail environment, such as a grocery store. The display screen 17 is divided into a grid of cells 20. Each representing a unique coupon item. When a shopper finds a desired product, the shopper simply touches that cell, and the coupon dispenser apparatus instantly prints the coupon. In situations where the coupon dispensing apparatus is used in grocery stores, it may be desirable for the product cells to be organized and color-coded by food category making it easy to skim through the choices.

Figure 4:
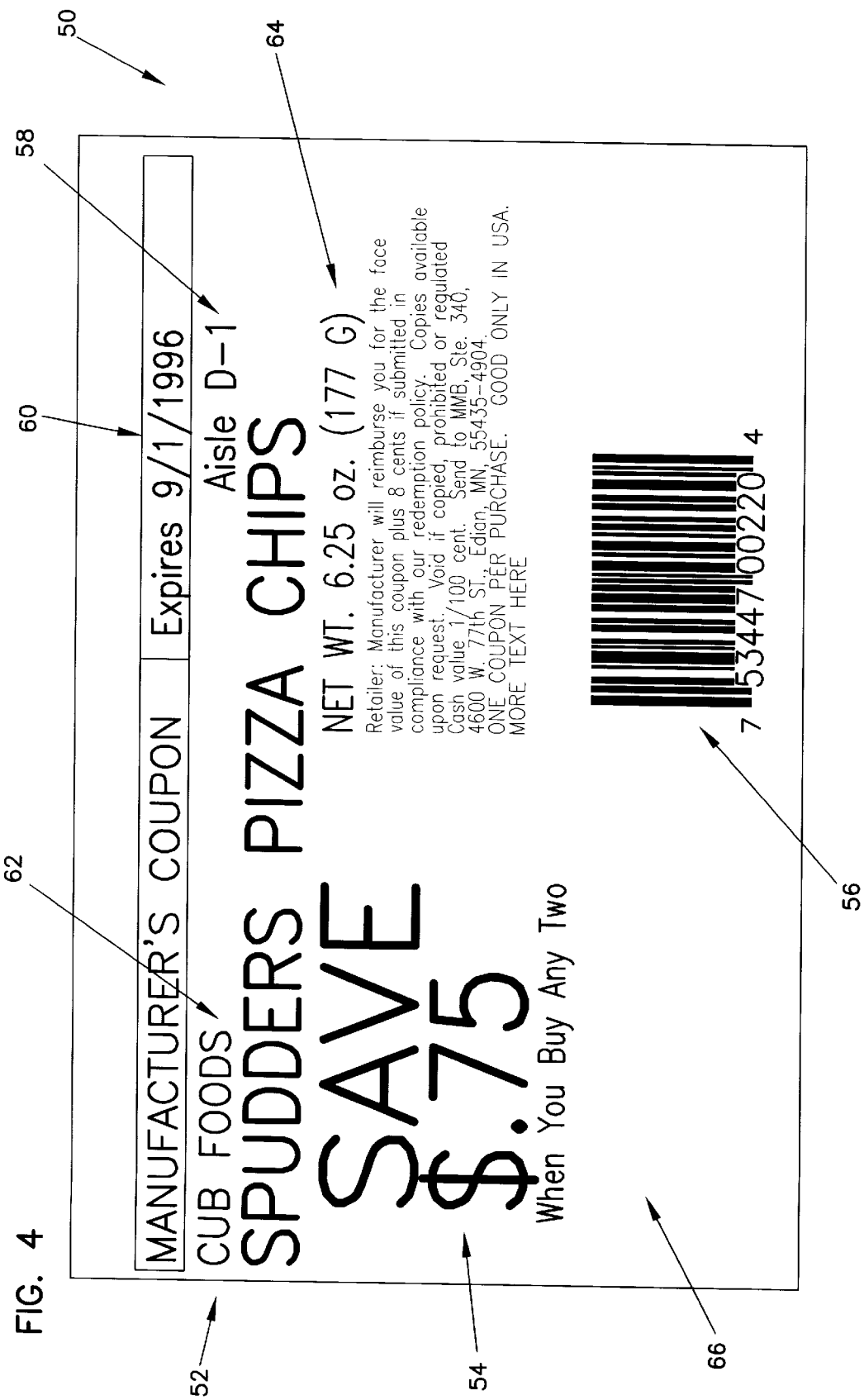
FIG. 4 is an exemplary coupon according to the principles of the present invention which can be generated according to the coupon dispensing apparatus of the present invention.

The display screen 17 can be any type of system which provides a signal when a particular cell 20 is selected by a customer or consumer. As shown in FIG. 4, the cells 20 of display screen 17 are divided into horizontal rows and vertical columns. The display screen 17 is constructed and arranged such that selection of a particular cell by an individual will provide a detectable signal. The signal can be provided by, for example, a simple button which can be depressed. Alternatively, more technically advanced and consumer-friendly systems are available. Exemplary types of systems which can be used to provide a detectable signal when a particular cell is selected include capacitive systems, variable resistance systems, and optical detecting systems. In general, a capacitive system detects a change in the electrical circuitry of the cell as a result of the proximity of a human body. The variable resistance system operates by detecting a change in resistance caused by a touch. The optical detecting system functions by detecting presence by using light emitters. A company which provides similar types of technology is Transparent Products, Incorporated, located in Valencia, Calif. A preferred display screen can be provided according to U.S. Pat. No. 4,550,221 to Mabusth, the entire disclosure of which is incorporated herein by reference.

An important feature in selecting the type of display screen to be used in the present invention includes consideration of the graphics which will be displayed by the display screen. Each cell 20 should represent a particular good and include graphics describing and/or advertising that good. Thus, the type of display screen system should be one which will allow the graphics to change on a regular and periodic basis. For example, it may be desirable to alter the graphics of the display screen every week as a result in the change of promotional items being offered for sale. Thus, it may be desirable to provide a display screen which will allow an underlay or overlay containing the graphics to be easily inserted into place. The display screen 17 includes row and column designators 45. A handicapped user can simply use these designators 45 to identify a particular cell and activate that cell using the handicapped keypad.

Now referring to FIG. 4, an exemplary coupon which can be generated by the coupon dispensing apparatus of the invention is provided at reference numeral 50. Similar to most coupons presently available, the coupon 50 contains product information 52, savings information 54, and a UPC barcode 56 which automatically identifies the name of the product, the manufacturer, the value of the coupon, and its expiration date. This type of information is common to most conventionally used coupons. Additional information can be provided on the coupons. In addition to the information discussed above, the coupon can include the expiration date 60, the grocery store name 62, the size of the product 64, and information which may be needed in order to correctly utilize the coupon 66.

As an added and unique benefit, it also includes the aisle location 58 of the product in that particular store making shopping an easier, an more pleasant experience for the consumer. Advantageously, the specific aisle or location of the product can be identified for each store. Furthermore, if products change location, the coupon dispensing apparatus can be programmed to reflect the change in location of the product, and the coupon can then be printed with the new location.

One advantage of the coupon dispensing apparatus is its flexibility. Since the coupon cells can be leased out on a store-by-store basis, manufacturers can easily gear their promotions to a specific area, a specific chain of stores, or even a specific individual store. This provides an ideal opportunity to test market different incentive programs and compare the results. It is expected that the coupon dispensing apparatus can be used to periodically adjust the display of coupons being dispensed. For example, the graphics display area can be changed periodically, such as every month. This gives the manufacturer the opportunity to launch new promotions and provides consumers a reason to re-check the coupon dispensing apparatus each time they shop at a store.

Each time a consumer prints a coupon, it is logged into the computer memory arrangement. At a particular time interval, the manufacturer receives a report detailing the number of times each coupon was printed. This information can then be used to gauge the interest of various incentive programs and plan for future offerings, resulting in increased effectiveness. The coupon dispensing apparatus advantageously is capable of recording the number of times a particular coupon is ordered, the time of day the coupon is ordered, and the information can be compiled and transferred to the manufacturer and/or the vendor for developing their business objectives.

It should be understood that various software designs can be utilized for implementing the coupon dispensing apparatus of the invention. In general, it is expected that a coupon graphics software will be developed for application to a standard Windows® format, such as a bitmap or metafile, plus extended UPC barcode data into a central database computer or memory arrangement for subsequent processing. It is expected that a straightforward user interface will be adapted for relating coupon graphics to specific board locations, resulting in a printable poster layout, and a data file for downloading to the computer via a portable computer or the data necessary to print various coupons. It is expected that a default coupon format will be provided for customizable "manager special" coupons, and an easy-to-use user interface for entering store-specific location data. The software should provide an easy, menu-driven data download/upload function between the computer associated with the coupon dispenser and a portable computer. The coupon dispensing apparatus will additionally include printing and usage data logging functions. It should be further understood that it may be desirable to provide the computer within the coupon dispensing apparatus with a modem for communication with another computer located at a different site.

It is expected that the coupon dispensing apparatus of the invention will be used in the following described manner. Generally, it is expected that a manufacturer will contact the owner of the coupon dispensing apparatus to advertise a product thereof. Vendors of the product locate the coupon dispensing apparatus in their stores, such as grocery stores, and identifies the location of the product in the grocery store to be displayed on the apparatus. The vendor sends the information to the owner of the apparatus indicating the product in a store and where it is located. The owner then places that product on the apparatus, and inputs the store location on a computer diskette along with manufacturer's incentive (such as a coupon). The owner prints a graphics display for that particular vendor. The graphics display and the diskette are sent to the vendor and the information is placed on the apparatus. Consumers then select the particular cell identified on the apparatus and the apparatus prints out a coupon for the indicated product. The coupon leads the consumer to the location in the store where the product can be found. The consumer then picks up the product and takes it to the checkout counter where the clerk scans the product and the coupon.

It is believed that the coupon generating apparatus of the present invention will find particularly useful application in a grocery store. In general, it is expected that the coupon dispensing apparatus will be placed within two hundred feet of a particular grocery store's entrance. In general, it is expected that the coupon dispensing apparatus will have a size of approximately 78 inches in height, 48 inches in width, and 24 inches in depth. Thus, the apparatus will occupy about eight square feet of area. It is expected that the display screen will have a dimension of approximately 35.5 inches by 47.5 inches, and contain approximately 80–120 cell spaces, or more preferably, 100 cell spaces or 110 cell spaces. In addition, it is expected that the display screen will be back lit. By providing such a prominent display, it is expected that new or improved products and location of the products within the store will be readily available, and that the apparatus will provide additional awareness of products that have been on the market for a period of time. When provided in a grocery store, it is expected that the apparatus would be conveniently sized by selecting a size that fits at the end of an aisle.

It is expected that a daily report will be available to manufacturers who advertise on the coupon dispensing apparatus. In particular, the present invention advantageously allows easy reporting of the number of coupons printed for a particular product, the day of the month the coupon was requested, the time of day the coupon was requested, the value of the coupon, and the name of the store and address where the coupon was requested. Furthermore, if a store's scanning equipment has the ability to scan the coupon and identify the barcode, the report can additionally identify the number of coupons that were redeemed for each product.

What is claimed is:

1. A computer implemented coupon dispensing system comprising:

a display area comprising a display screen having a plurality of product identification cells, said plurality of product identification cells including a graphic display for identifying a product and said plurality of product identification cells provided for selecting the identified product;

a memory arrangement configured to store information comprising product identification information, product discount information, and product location information for locating a product in a store;

a processor coupled to said memory arrangement and said display screen and configured to process the information stored in the memory arrangement in order to generate selected product data packets including selected product identification information, selected product discount information and selected product location information;

printer coupled to said processor for printing coupons having selected product identification information, selected product discount information and selected product location information.

2. A computer implemented coupon dispensing system for dispensing coupons according to claim 1, wherein the display screen comprises a capacitive system.

3. A computer implemented coupon dispensing system for dispensing coupons according to claim 1, wherein the display screen comprises a variable resistance system.

4. A computer implemented coupon dispensing system for dispensing coupons according to claim 1, wherein the display screen comprises an optical detecting system.

5. A computer implemented coupon dispensing system for dispensing coupons according to claim 1, further comprises a keypad.

6. A computer implemented coupon dispensing system for dispensing coupons according to claim 5, wherein the keypad comprises a handicap keypad.

7. A computer implemented coupon dispensing system for dispensing coupons according to claim 1, wherein the memory arrangement comprises a disk drive for storing information.

8. A computer implemented coupon dispensing system for dispensing coupons according to claim 1, further comprising an additional printer coupled to said processor for printing coupons having selected product identification information, selected product discount information, and selected product location information for locating a product in a store.

9. A computer implemented coupon dispensing system for dispensing coupons according to claim 1, further comprising a modem for providing remote access to said memory arrangement.

10. A computer implemented coupon dispensing system for dispensing coupons according to claim 1, wherein the memory arrangement is configured for storing information including number of signals generated for a product, date of signal generation for a product, and time of day for generating a product.

11. A computer implemented coupon dispensing system for dispensing coupons according to claim 1, wherein the computer implemented coupon dispensing system includes a display wall containing said display area and includes between about 50 and 150 of said product identification cells.

12. A computer implemented coupon dispensing system for dispensing coupons according to claim 1, wherein said plurality of product identification cells comprise a button which can be depressed to generate a detectable signal.

13. A computer implemented coupon dispensing system for dispensing coupons according to claim 1, further comprising a keyboard for inputting information.

14. A computer implemented method for dispensing coupons comprising steps of:
 (a) generating a coupon identifying signal by providing a display screen having a plurality of product identification cells, wherein said plurality of product identification cells comprise a graphic display for identifying a product, and selecting at least one of the plurality of product identification cells to select the identified product;
 (b) processing the coupon identifying signal and data provided in a memory arrangement to generate a coupon printing signal, said memory arrangement configured to store information comprising product identification information, product discount information, and product location information for locating a product in a store; and
 (c) printing a coupon from a printer upon receipt of the coupon printing signal, said coupon including product identification information, product discount information, and product location information for locating a product in a store.

15. A computer implemented method for dispensing coupons according to claim 14, wherein the display screen comprises a capacitive system.

16. A computer implemented method for dispensing coupons according to claim 14, wherein the display screen comprises a variable resistance system.

17. A computer implemented method for dispensing coupons according to claim 14, wherein the display screen comprises an optical detecting system.

18. A computer implemented method for dispensing coupons according to claim 14, wherein said step of generating a coupon identifying signal comprises touching at least one of the plurality of cells.

19. A computer implemented method for dispensing coupons according to claim 14, further comprising a step of recording date and time information for selection of at one of the plurality of cells.

20. A computer implemented method for dispensing coupons according to claim 19, further comprising a step of accessing the memory arrangement via modem.

21. A computer implemented method for dispensing coupons according to claim 14, wherein each of said plurality of product identification cells comprise a button for depressing.

22. A computer implemented method for dispensing coupons comprising steps of:
 (a) providing a computer implemented coupon dispensing system comprising:
  a display area comprising a display screen having a plurality of product identification cells, said plurality of product identification cells including a graphic display for identifying a product of said plurality of product identification cells provided for selecting the identified product;
  a memory arrangement configured to store information comprising product identification information, product discount information, and product location information for locating a product in a store;
  a processor coupled to said memory arrangement and said display screen and configured to process the information stored in the memory arrangement in order to generate selected product data packets including selected product identification information, selected product discount information and selected product location information;
  printer coupled to said processor for printing coupons having selected product identification information, selected product discount information and selected product location information;
 (b) selecting a product identification cell; and
 (c) generating a coupon from the printer, the coupon having selected product identification information, selected product discount information and selected product location information.

23. A computer implemented method for dispensing coupons according to claim 22, wherein the display screen comprises a capacitive system.

24. A computer implemented method for dispensing coupons according to claim 22, wherein the display screen comprises a variable resistance system.

25. A computer implemented method for dispensing coupons according to claim 22, wherein the display screen comprises an optical detecting system.

26. A computer implemented method for dispensing coupons according to claim 22, wherein the plurality of product identification cells comprise a button which can be depressed for selecting a product identification cell.

* * * * *